United States Patent
Qin et al.

(10) Patent No.: US 12,158,371 B2
(45) Date of Patent: Dec. 3, 2024

(54) CALIBRATION PRECISION ENHANCEMENT METHOD FOR DIGITAL SCALE

(71) Applicant: Shenzhen Chenbei Technology Co., Ltd., Shenzhen (CN)

(72) Inventors: Zhiling Qin, Shenzhen (CN); Tingfeng Chen, Shenzhen (CN); Lei Zhang, Shenzhen (CN)

(*) Notice: Subject to any disclaimer, the term of this patent is extended or adjusted under 35 U.S.C. 154(b) by 156 days.

(21) Appl. No.: 17/565,369

(22) Filed: Dec. 29, 2021

(65) Prior Publication Data
US 2022/0205834 A1 Jun. 30, 2022

(30) Foreign Application Priority Data
Dec. 31, 2020 (CN) .......................... 202011640277.2

(51) Int. Cl.
*G01G 23/01* (2006.01)
*G01G 19/12* (2006.01)
*G01G 23/37* (2006.01)

(52) U.S. Cl.
CPC ............. *G01G 23/01* (2013.01); *G01G 19/12* (2013.01); *G01G 23/3707* (2013.01)

(58) Field of Classification Search
CPC ..... G01G 23/01; G01G 23/3707; G01G 19/12
USPC ........................................... 177/150; 73/1.13
See application file for complete search history.

(56) References Cited

U.S. PATENT DOCUMENTS

| | | | | |
|---|---|---|---|---|
| 4,181,946 A | * | 1/1980 | Loshbough | G01G 23/3707 177/25.15 |
| 4,204,197 A | * | 5/1980 | Loshbough | H03M 1/007 705/414 |
| 4,535,854 A | * | 8/1985 | Gard | G01G 23/01 177/1 |
| 4,535,857 A | * | 8/1985 | Haze | G01G 23/01 73/1.13 |
| 4,660,663 A | * | 4/1987 | Amacher | G01G 23/3707 73/1.13 |
| 4,694,920 A | * | 9/1987 | Naito | G01G 23/01 177/25.18 |
| 4,703,815 A | * | 11/1987 | Hirano | G01G 19/393 73/1.13 |
| 4,727,947 A | * | 3/1988 | Naito | G01G 19/32 177/1 |

(Continued)

FOREIGN PATENT DOCUMENTS

CN 109063325 A * 12/2018 ............. G01G 19/00

*Primary Examiner* — Peter J Macchiarolo
*Assistant Examiner* — Monica S Young
(74) *Attorney, Agent, or Firm* — Tsz Lung Yeung

(57) ABSTRACT

A method of calibrating a digital scale includes the steps of: (101) acquiring a first AD conversion value by the digital scale, the first AD conversion value corresponding to a weight of a reference object gathered before calibration; (102) acquiring a second AD conversion value by the digital scale, the second AD conversion value corresponding to a value when the digital scale has a weight reading of 0; (103) acquiring a target weight of a reference object; and (104) ascertaining a target AD conversion value per unit weight by reference to the first AD conversion value, the second AD conversion value and the target weight of the reference object, the target AD conversion value per unit weight being arranged to measure a weight of an object by the digital scale after calibration.

5 Claims, 6 Drawing Sheets

(56) References Cited

U.S. PATENT DOCUMENTS

| | | | | |
|---|---|---|---|---|
| 4,771,836 A | * | 9/1988 | Naito | G01G 19/32 |
| | | | | 177/185 |
| 4,850,442 A | * | 7/1989 | Naito | G01G 23/163 |
| | | | | 73/1.13 |
| 4,909,338 A | * | 3/1990 | Vitunic | G01G 23/01 |
| | | | | 73/1.13 |
| 2014/0353049 A1 | * | 12/2014 | Vidal | G01G 19/414 |
| | | | | 177/25.13 |
| 2022/0050003 A1 | * | 2/2022 | Brown | G01L 25/003 |

\* cited by examiner

CALIBRATION PRECISION ENHANCEMENT METHOD FOR DIGITAL SCALE

CROSS REFERENCE TO RELATED APPLICATION

This is a non-provisional application which claims priority to a Chinese patent application having an application number of CN202011640277.2, and a filing date of Dec. 31, 2020, the entire contents of which is hereby incorporated by reference.

BACKGROUND OF THE PRESENT INVENTION

Field of Invention

The present invention relates to a digital scale, and more particularly to a a method of calibrating a digital scale for achieving better measurement precision.

Description of Related Arts

Digital scales have widely been utilized around the world. A digital scale may be utilized to measure the weight of an object or a body. In recent years, with the development of smart devices and networks, many digital scales may have the capabilities of connecting to a client terminal, such as a smart phone, so that a user may be able to monitor and control a connected digital scale through a designated software, such as an application installed in the client terminal. With the help of a properly designed application and/or server, operational parameters may be controlled and modified in the client terminal and measurement results from the digital scale may be transmitted to the server and/or the terminal device for further analysis and storage.

A major disadvantage of conventional digital scales such as those described above is that they suffer from inaccurate calibration and measurements. More specifically, almost all conventional digital scales do not respond or adjust to environmental factors when they perform measurements. This may lead to inaccurate measurement results and adversely affect users' experience when using the digital scales.

SUMMARY OF THE PRESENT INVENTION

Certain variations of the present invention provide a method of processing requests and a system implementing this method for minimizing waste of sources when a network system processes requests.

In one aspect of the present invention, it provides a method of calibrating a digital scale, comprising the steps of:

(101) acquiring a first AD conversion value by the digital scale, the first AD conversion value corresponding to a weight of a reference object gathered before calibration;

(102) acquiring a second AD conversion value by the digital scale, the second

AD conversion value corresponding to a value when the digital scale has a weight reading of 0;

(103) acquiring a target weight of a reference object; and (104) ascertaining a target AD conversion value per unit weight by reference to the first AD conversion value, the second AD conversion value and the target weight of the reference object, the target AD conversion value per unit weight being arranged to measure a weight of an object by the digital scale after calibration.

In another aspect of the present invention, it provides a request processing system, comprising:

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Therefore, the above terms should not be an actual connection limitation of the elements of the present invention.

Figure 1:
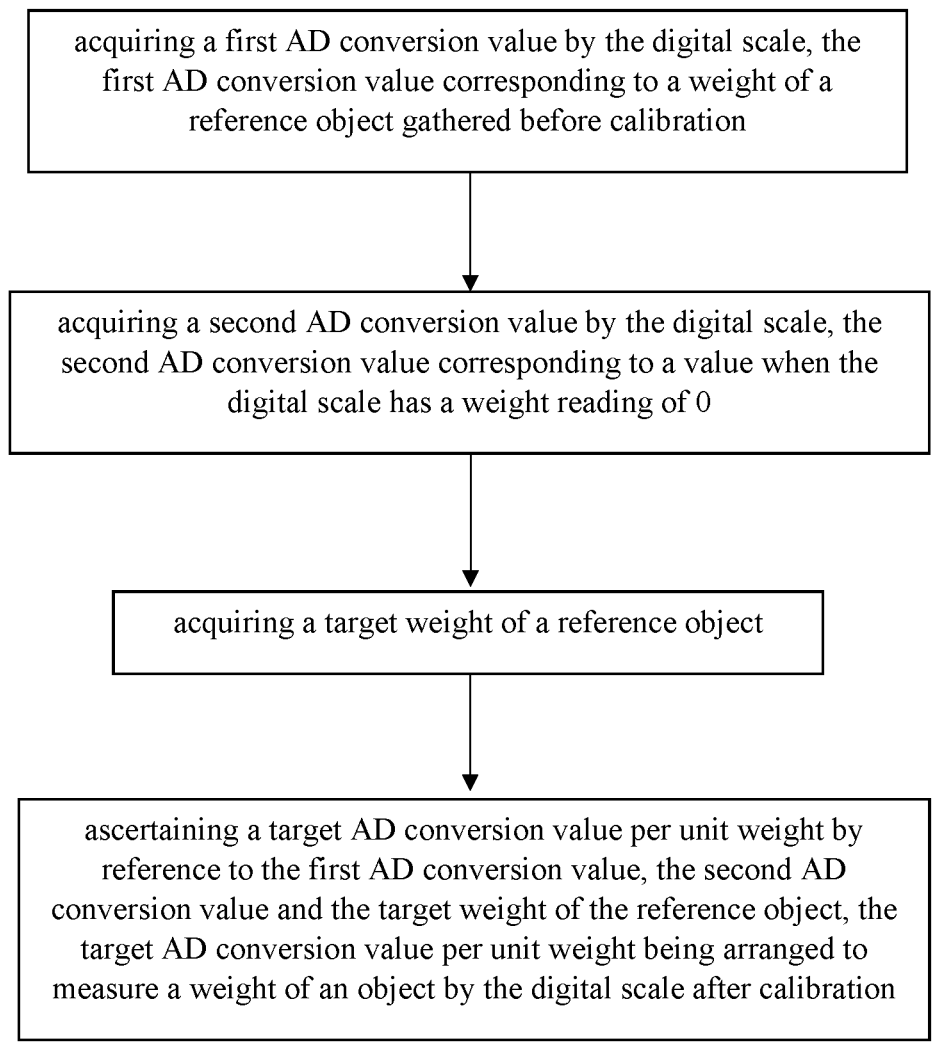
FIG. 1 is a block diagram illustrating a method of calibrating a digital scale according to a preferred embodiment of the present invention.

Referring to FIG. 1 of the drawings, a method of calibrating a digital scale, comprising the steps of:

(101) acquiring a first analog-digital (hereinafter referred to as "AD") conversion value by the digital scale, the first AD conversion value corresponding to a weight of a reference object gathered before calibration;

(102) acquiring a second AD conversion value by the digital scale, the second AD conversion value corresponding to a value when the digital scale has a weight reading of 0;

(103) acquiring a target weight of a reference object; and (104) ascertaining a target AD conversion value per unit weight by reference to the first AD conversion value, the second AD conversion value and the target weight of the reference object, the target AD conversion value per unit weight being utilized for measuring a weight of an object by the digital scale after calibration.

According to the preferred embodiment of the present invention, the method of calibration may be implemented in a digital scale for measuring a weight of an object. The digital scale may be wirelessly connected to a terminal device. The wireless connection may be accomplished through short-range wireless technology (e.g. BLUETOOTH) or through wireless network protocols (e.g. WIFI). For example, the digital scale may be wirelessly connected to a terminal device such as a smartphone. A specifically designated program or application may be installed in the smartphone for processing the information sent from the digital scale. The terminal device may also be embodied as other devices, such as a tablet computer or a desktop computer. The terminal device may be equipped with a display and a processor and may be connected to the digital scale through wireless technology or even wired methods.

The method of calibrating a digital scale may further comprise a step (100), before step (101), of switching to a calibration mode by the digital scale. The switching of the calibration mode may be initiated by the terminal device or the digital scale. For example, a user may command the digital scale to enter the calibration mode by operating on the programed installed in the terminal device. In this scenario, step (100) may comprise the steps of wirelessly receiving a signal from a terminal device by the digital scale for commanding the digital scale to enter the calibration mode, and sending a response signal from the digital scale back to the terminal device for confirming that the digital scale has entered the calibration mode.

It is worth mentioning that the reference object may take a wide variety of forms. For example, the reference object may be an object possessing a standard or known weight. The most important feature is that the weight of the reference object must be known before calibration is performed. In some circumstances, the user's body itself may also be used as the reference object. The weight of the reference object may be measured by the digital scale so as to generate the first AD conversion value before calibration is performed.

The weight of the reference object may be measured by putting the reference object on the digital scale. The result of the measurement may be displayed on the digital scale through a display screen, and/or transmitted to the terminal device through wireless or wired communication protocols.

The digital scale mentioned above may measure an object's weight by measuring an AD conversion value through a sensor, such as a pressure sensor. The AD conversion value may correspond to a weight through a predetermined mapping process. For example, a particular AD conversion value may correspond to a weight in a predetermined unit after mapping.

When the digital scale has entered the calibration mode, the digital scale may obtain the first AD conversion value for the reference object. For the sake of convenience, this AD conversion value may be designated as $AD_1$.

In step (102), the second AD conversion value may be acquired and stored in the digital scale. The second AD conversion value may corresponding to a value when the digital scale has a weight reading of 0. For the sake of convenience, the second AD conversion value may be designated as $AD_0$.

In step (103), the target weight of the reference object may be the weight of the reference object obtained after calibration. The target weight may be considered as the actual weight of the reference object. According to the preferred embodiment of the present invention, the target weight of the reference object may be obtained from the terminal device through wireless or wired transmission. A user may manually input the target weight of the reference object in the terminal device through a designated program (such as a designated application in the smartphone), and the manually input target weight may then be transmitted to the digital scale through wireless or wired transmission.

The method of calibrating a digital scale may further comprise the steps of:

(31) when the digital scale is in the calibration mode, gathering a pre-calibration weight of the reference object measured before calibration;

(32) obtaining a difference between the pre-calibration weight of the reference object and the target weight of the reference object; and

(33) generating a warning signal when the difference obtained in step (32) is greater than a predetermined calibration threshold.

The digital scale may initially measure the weight of the reference object before calibration. The weight thus obtained may be designated as W1. The target weight may be designated as W2. When the absolute value of the difference between W1 and W2 is greater than a predetermined calibration threshold M, the warning signal may be generated. This warns the user of the digital scale that there is a relatively big difference between the weight of the reference object and the target weight. The user may need to re-confirm whether or not the calibration should be continued. In this preferred embodiment, the warning signal may be generated by the digital scale or the terminal device. This step may prevent wrong or aberrant input of W2 to the digital scale.

The predetermined calibration threshold mentioned in step (33) above may be obtained by the steps of:

ascertaining a calibration range according to a mapping relation between a predetermined weight and the corresponding calibration range; and obtaining an absolute value of the calibration range and setting the absolute value of the calibration range as the predetermined calibration threshold.

The mapping relationship may be stored in the digital scale. Such mapping relationship may also be adjusted according to the circumstances in which the digital scale is utilized. For example, when the measured weight is equal to or less than 100 kg, the calibration range may be set as ±0.5 kg. When the measured weight is greater than 100 kg, the calibration range may be set as ±3 kg.

Thus, the method mentioned above may ascertain the calibration range according to the mapping relation between a predetermined weight and a corresponding calibration range. The predetermined calibration threshold may be obtained by taking the absolute value of the calibration threshold. For example, when W1>100 kg, the corresponding calibration range may be ±3 kg, and the calibration threshold is therefore 3.

It is worth mentioning that by setting different calibration range for different weights, and limiting the calibration range to a predetermined calibration threshold, the present invention effectively prevents inaccurate reading due to inaccurate calibration range.

In step (104), the target AD conversion value per unit weight may be ascertain by reference to the first AD conversion value, the second AD conversion value and the target weight of the reference object. The target AD conversion value per unit weight may be utilized for measuring a weight of an object by the digital scale after calibration.

Specifically, by ascertaining W1, $AD_1$, and $AD_0$, the target weight obtained by the digital scale is W2. When the reference object is put on the digital scale, the corresponding target AD conversion value $AD_2$ will be equal to $AD_1$. The digital scale may calculate the new target AD conversion value per unit weight by the following equation:

$$AD_2'=(AD_2-AD_0)/W2=(AD_1-AD_0)/W2.$$

The digital scale may measure the weight of the reference object before calibration and obtain W1 and $AD_1$. Hence, the AD conversion value per unit weight is equal to $AD_1'=(AD_1-AD_0)/W1$. Thus, one skilled in the art may appreciate that the present invention may adjust and update the AD conversion value per unit weight from $AD_1'$ to $AD_2'$. When the target AD conversion value per unit weight has been updated, measuring weight thereafter may utilize the updated target AD conversion value per unit weight.

Specifically, in subsequent weight measurement, W=measured $AD/AD_2'$, where W is the weight of an object as measured by the digital scale, AD is the AD conversion value per unit weight as measured by the digital scale.

The method of calibrating a digital scale may further comprise the steps of:

ascertaining a target weight interval of a reference object;

acquiring a AD conversion value per unit weight for at least another target weight interval, wherein such AD conversion value per unit weight for at least another target weight interval is pre-stored in at least one of the digital scale and the terminal device; and averaging the AD conversion values per unit weight for all target weight intervals to obtain an average AD conversion value per unit weight, wherein the average AD conversion value per unit weight may be stored for future measurements of weight by the digital scale.

It is worth mentioning that the AD conversion value per unit weight may be different for each target weight interval, averaging the AD conversion values per unit weight for all target weight intervals may allow a more consistent and accurate measurement result. For example, the AD conversion value per unit weight may be obtained for three different target weight intervals, such as 0 kg-50 kg, 51 kg-100 kg, and 101 kg-150 kg, and the AD conversion values per unit weight for all these target weight intervals may then be averaged to obtain the average AD conversion value per unit weight.

As an alternative to the above-mentioned method, when $AD_2'$ has been obtained in actual measurement, the AD conversion value per unit weight for the other target weight intervals may also be obtained and averaged to obtained an average AD conversion value per unit weight $\overline{AD}$, such that W=measured $AD/\overline{AD}$.

For a digital scale, different weight intervals may have different AD conversion value and these AD conversion values may not be linearly distributed with respect to weight. As a result, the AD conversion values of each of the weight intervals may be gathered and locally stored in the digital scale. For example, weight intervals may be divided as 0 kg-50 kg, 51 kg-100 kg and 101 kg-150 kg. The AD conversion values for 50 kg, 100 kg and 150 kg may be obtained respectively. In actual measurement, the digital scale may first roughly determine the weight interval of an object. The calibrated AD conversion value in this particular weight interval may then be averaged with the AD conversion value of other pre-stored weight intervals to come up with the average AD conversion value per unit weight.

It is worth mentioning that calibration of the digital scale may frequently be required due to several reasons. For example, inaccurate measurement results may be due to improper operation or due to the digital scale being positioned in inappropriate locations. Inaccurate measurement results may be illustrated by the fact that the digital scale may come up with substantially different measurement readings for several sequential measurements. Inaccurate measurements may also result from accidental impacts or improper handling of the digital scale.

Step (101) through step (104) described above may ascertain the target AD conversion value per unit weight, and this target AD conversion value per unit weight may be used to measure the weight of the object post-calibration.

Figure 2:
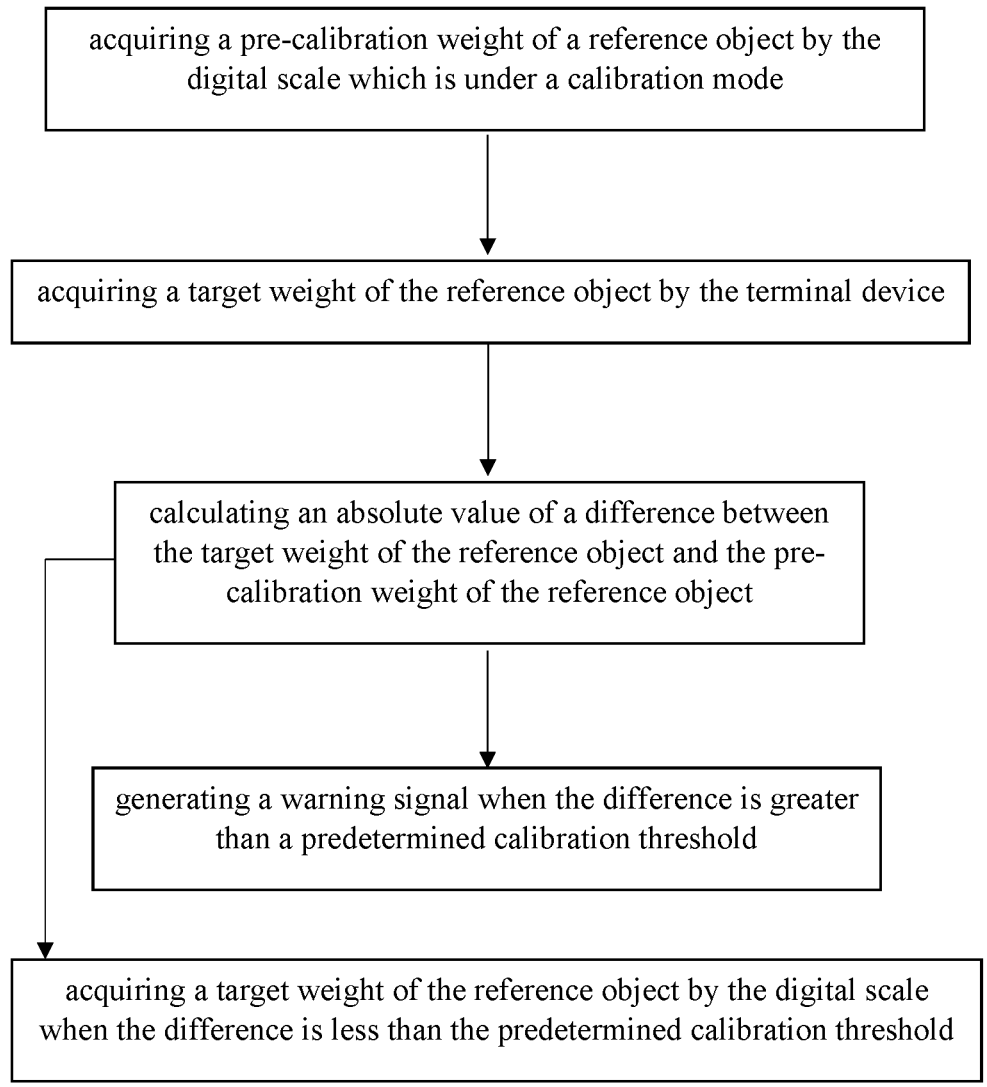
FIG. 2 is a block diagram illustrating a method of calibrating a digital scale according to a first alternative mode of the preferred embodiment of the present invention.

Referring to FIG. 2 of the drawings, a first alternative mode of the method of calibrating a digital scale is illustrated. The method may comprise the steps of:

(201) acquiring a pre-calibration weight of a reference object by the digital scale which is under a calibration mode;

(202) acquiring a target weight of the reference object by the terminal device;

(203) calculating an absolute value of a difference between the target weight of the reference object and the pre-calibration weight of the reference object;

(204) generating a warning signal when the difference obtained in step (203) is greater than a predetermined calibration threshold; and (205) acquiring a target weight of the reference object by the digital scale when the difference obtained in step (203) is less than the predetermined calibration threshold.

According to this alternative mode, the method of calibration may be implemented in a digital scale for measuring a weight of an object. The digital scale may be wirelessly connected to a terminal device. The wireless connection may be accomplished through short-range wireless technology (e.g. BLUETOOTH) or through wireless network protocols (e.g. WIFI). For example, the digital scale may be wirelessly connected to a terminal device such as a smartphone. A specifically designated program or application may be installed in the smartphone for processing the information sent from the digital scale. The terminal device may also be embodied as other devices, such as a tablet computer or a desktop computer. The terminal device may be equipped with a display and a processor and may be connected to the digital scale through wireless technology or even wired methods.

Step (201) through step (205) may be carried out with respect to a terminal device. Thus, step (201) may comprise the steps of commanding a digital scale to enter a calibration mode; measuring a pre-calibration weight of a reference object by the digital scale; and receiving the pre-calibration weight of the reference object from the digital scale.

As in the preferred embodiment described above, the reference object may take a wide variety of forms. For example, the reference object may be an object possessing a standard or known weight. The most important feature is that the weight of the reference object must be known before the calibration is performed. In some circumstances, the user's body itself may also be used as the reference object. The weight of the reference object may be measured by putting the reference object on the digital scale. The result of the measurement may be displayed on the digital scale through a display screen, and/or transmitted to the terminal device through wireless or wired communication protocols.

In step (202), the target weight of the reference object is the post-calibration weight of the reference object. Ideally, the target weight is the actual weight of the reference object. The target weight may be utilized as the reference for the digital weight to calibrate. In this alternative mode, the target weight of the reference object may be manually input by a user through the terminal device. Note that the target weight of the reference object may be different from the pre-calibration weight of a reference object stated in step (201).

In step (204), the terminal device may ascertain whether or not the difference obtained in step (203) is greater than the predetermined calibration threshold. If this is the case, terminal device may not allow the calibration process to continue. Alternatively, the terminal device may be programed to allow the calibration process to continue regardless of the warning.

Figure 3:
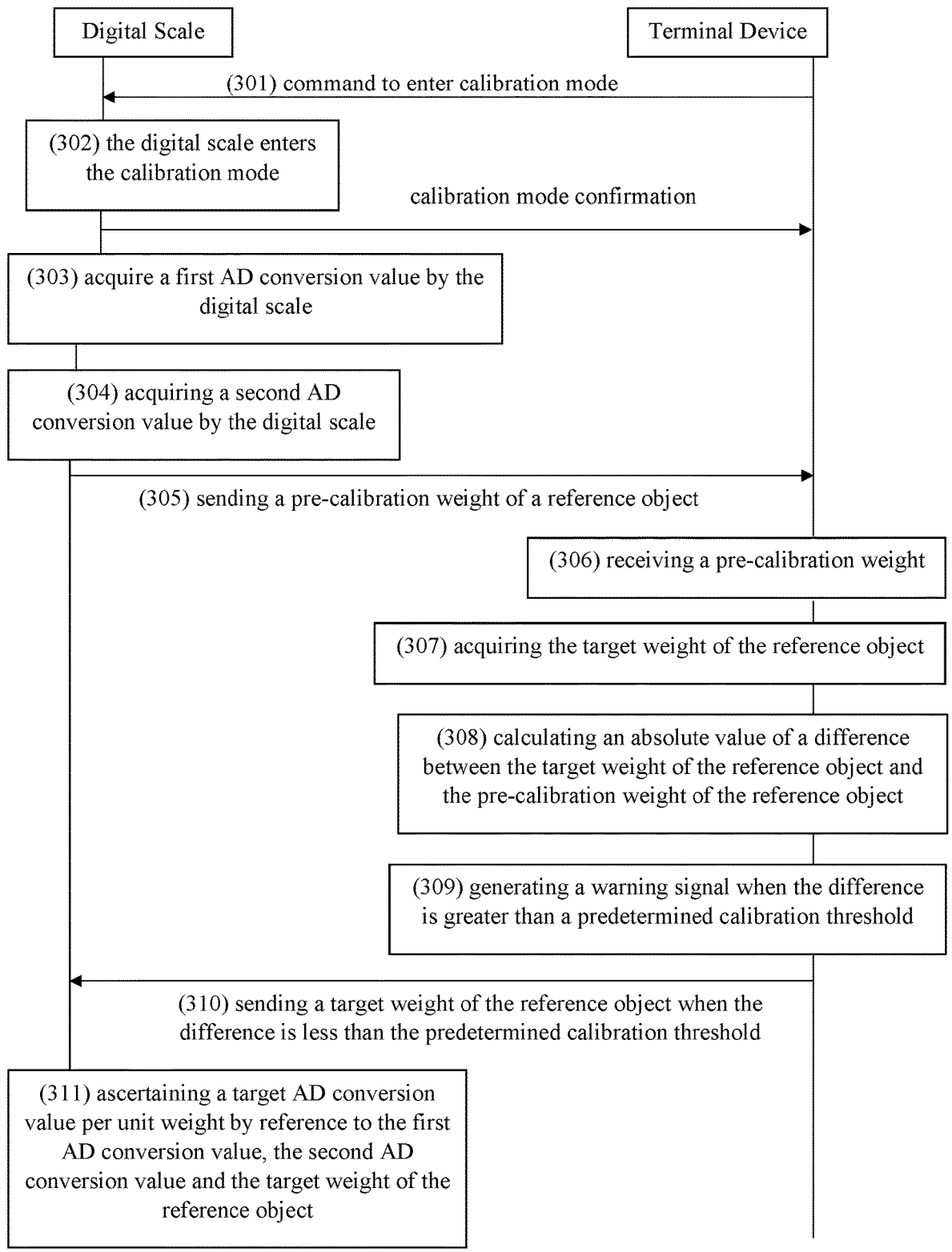
FIG. 3 is a block diagram illustrating a method of calibrating a digital scale according to a second alternative mode of the preferred embodiment of the present invention.

Referring to FIG. 3 of the drawings, a second alternative mode of the method of calibrating a digital scale is illustrated. The method may comprise the steps of:

(301) receiving a command from a terminal device by a digital scale to enter a calibration mode;

(302) sending a response signal from the digital scale to the terminal device to confirm that the digital scale has entered the calibration mode;

(303) acquiring a first AD conversion value by the digital scale, wherein the first AD conversion value corresponds to a pre-calibration weight of a reference object;

(304) acquiring a second AD conversion value by the digital scale, the second AD conversion value corresponding to a value when the digital scale has a weight reading of 0;

(305) sending a pre-calibration weight of a reference object from the digital scale to the terminal device;

(306) receiving a pre-calibration weight by the terminal device from the digital scale;

(307) acquiring the target weight of the reference object by the terminal device, wherein the target weight may be manually input by the user of the digital scale;

(308) calculating an absolute value of a difference between the target weight of the reference object and the pre-calibration weight of the reference object by the terminal device;

(309) generating a warning signal by the terminal device when the difference obtained in step (308) is greater than a predetermined calibration threshold; and (310) sending a target weight of the reference object from the terminal device to the digital scale when the difference obtained in step (308) is less than the predetermined calibration threshold; and (311) ascertaining, by the digital scale, a target AD conversion value per unit weight by reference to the first AD conversion value, the second AD conversion value and the target weight of the reference object, the target AD conversion value per unit weight being utilized for measuring a weight of an object by the digital scale after calibration.

In the second alternative mode of the present invention, the method of calibrating a digital scale may further comprise the steps of:

sending a response from the digital scale to the terminal device that a calibration of the digital scale has been completed; and generating a confirmation signal by the terminal device indicating that calibration of the digital scale has been completed.

The confirmation signal generated by the terminal device may be in the form of a voice signal or visual signal. The goal is to notify the user that the digital scale has been correctly calibrated.

Figure 4:
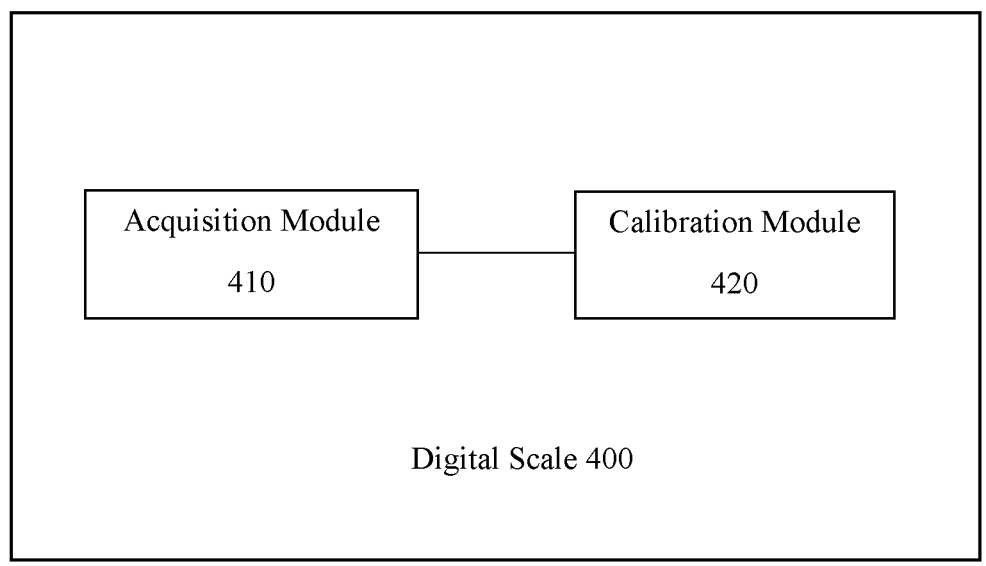
FIG. 4 is a block diagram illustrating a calibration system for a digital scale according to the preferred embodiment of the present invention.

Referring to FIG. 4 of the drawings, the present invention also provides a calibration system for a digital scale 400, comprising an acquisition module 410 and a calibration module 420.

The acquisition module 410 may be arranged to gather a first AD conversion value by the digital scale, wherein the first AD conversion value is corresponding to a weight of a reference object gathered before a calibration.

The acquisition module 410 may also be arranged to acquire a second AD conversion value by the digital scale, wherein the second AD conversion value is corresponding to a value when the digital scale has a weight reading of 0. Moreover, the acquisition module 410 may also be arranged to acquire a target weight of the reference object.

The calibration module may be arranged to ascertain a target AD conversion value per unit weight by reference to the first AD conversion value, the second AD conversion value and the target weight of the reference object, wherein the target AD conversion value per unit weight may be utilized for measuring a weight of an object by the digital scale after calibration.

Thus, one skilled in the art may appreciate that the steps illustrated above may be executed and implemented by the calibration system described above and illustrated in FIG. 4 of the drawings. The calibration system thus described may be implemented in a digital scale 400.

Figure 5:
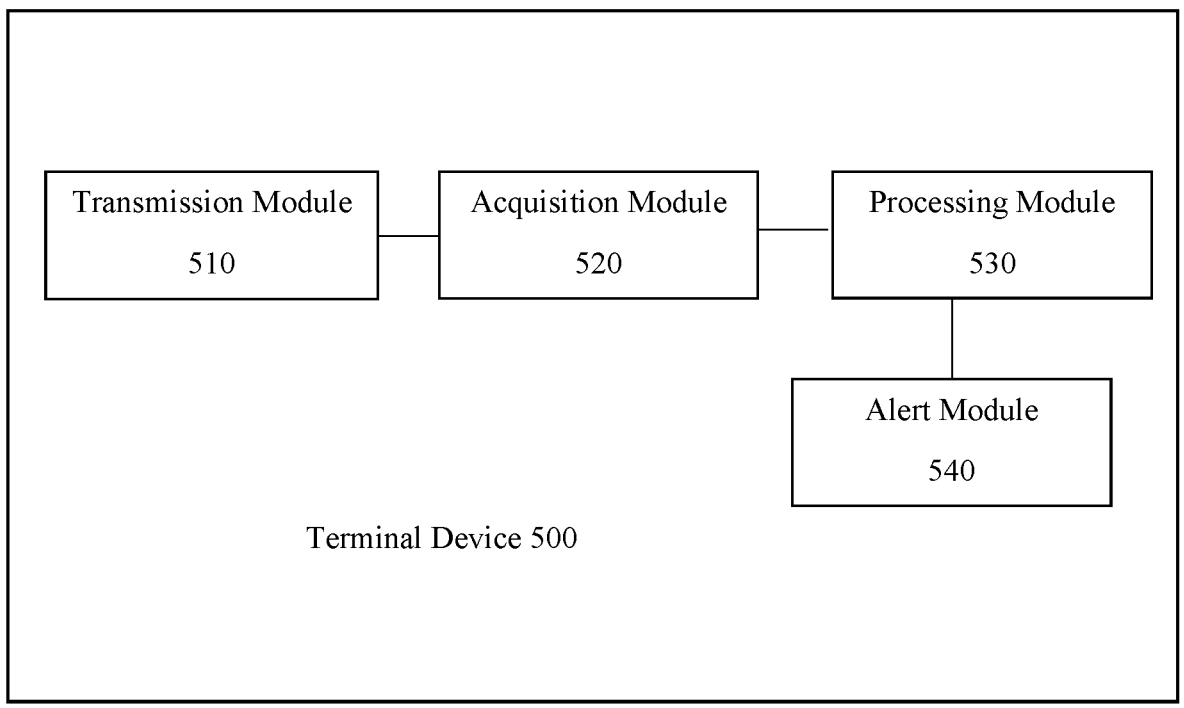
FIG. 5 is a block diagram illustrating a terminal device for a digital scale according to the preferred embodiment of the present invention.

Referring to FIG. 5 of the drawings, the present invention also provides a terminal device 500 for a digital scale, comprising:

a transmission module 510 configured to transmit a target weight of a reference object to a digital scale under a calibration mode, wherein the target weight may be utilized for ascertaining a target AD conversion value per unit weight, the target AD conversion value per unit weight being utilized for measuring a weight of an object after the digital scale is calibrated, the transmission module 510 further being configured to receive a pre-calibration weight of the reference object, wherein the pre-calibration weight of the reference object may be sent from the digital scale under a calibration mode;

an acquisition module 520 configured to acquire a target weight of the reference object;

a processing module 530 configured to calculate an absolute value of the difference between the pre-calibration weight of the reference object and the target weight of the reference object; and an alert module 540 configured to generate a warning signal when the absolute value of the difference between the pre-calibration weight of the reference object and the target weight of the reference object is greater than a predetermined calibration threshold.

The transmission module 510 may further be configured to send a target weight of the reference object when the absolute value of the difference between the pre-calibration weight of the reference object and the target weight of the reference object is less than the predetermined calibration threshold.

It is worth mentioning that the steps illustrated in FIG. 1 to FIG. 3 may be executed by the terminal device 500 described above.

Figure 6:
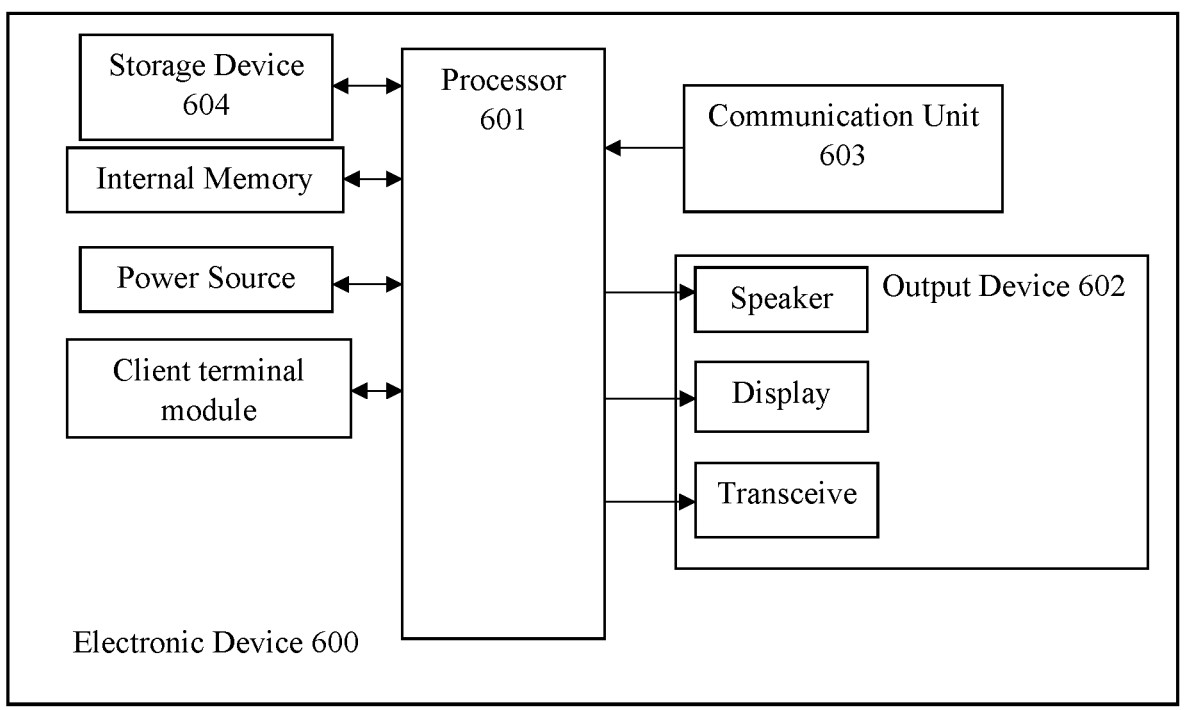
FIG. 6 is a block diagram illustrating an electronic device for a digital scale according to the preferred embodiment of the present invention.

Referring to FIG. 6 of the drawings, the present invention also provides an electronic device 600 for execution of the steps illustrated in FIG. 1 to FIG. 3 and described above. The electronic device 600 may comprise a processor 601, an output device 602, a communication unit 603 and a storage device 604. Each of these components may be connected through communication data buses.

The processor 601 may be configured as a central processing unit (CPU) of a computing device. The above-mentioned methods may be implemented as programs or applications and may be stored in the storage device 604 and executed by the processor 601. The storage device 604 may be configured as memory such as random access memory (RAM), non-volatile memory, hard disk, flash drive, solid state drive, etc.

The present invention, while illustrated and described in terms of a preferred embodiment and several alternatives, is not limited to the particular description contained in this specification. Additional alternative or equivalent components could also be used to practice the present invention.

What is claimed is:

1. A method of measuring a weight of an object by a digital scale, comprising the steps of:

wirelessly connecting a processor of said digital scale to a terminal device;

acquiring a first analog-digital conversion value by a processor of said digital scale, said first analog-digital conversion value corresponding to a weight of a reference object gathered before calibration;

acquiring a second analog-digital conversion value by a processor of said digital scale, said second analog-digital conversion value corresponding to a value when said digital scale has a weight reading of 0;

acquiring a target weight of a reference object; and ascertaining a target analog-digital conversion value per unit weight by a processor of said digital scale by reference to said first analog-digital conversion value, said second analog-digital conversion value and said target weight of said reference object, said target analog-digital conversion value per unit weight being arranged to measure a weight of an object by a processor of said digital scale after calibration;

when said digital scale is in a calibration mode, gathering a pre-calibration weight of said reference object measured before calibration;

obtaining a difference between said pre-calibration weight of said reference object and said target weight of said reference object; and generating a warning signal by said digital scale when said difference between said pre-calibration weight of said reference object and said target weight of said reference object is greater than a predetermined calibration threshold, wherein said predetermined calibration threshold is obtained by ascertaining a calibration range according to a mapping relation between a predetermined weight and said corresponding calibration range; and obtaining an absolute value of said calibration range and setting said absolute value of said calibration range as said predetermined calibration threshold; and after calibration of said digital scale, measuring a weight of an object by said digital scale with calibrated precision.

2. The method, as recited in claim 1, further comprising the steps of:

ascertaining a target weight interval of a reference object;

acquiring a analog-digital conversion value per unit weight for at least another target weight interval, wherein such analog-digital conversion value per unit weight for at least another target weight interval is pre-stored in at least one of said digital scale and said terminal device; and averaging said analog-digital conversion values per unit weight for all target weight intervals to obtain an average analog-digital conversion value per unit weight, wherein said average analog-digital conversion value per unit weight is stored for future measurements of weight by said digital scale.

3. The method, as recited in claim 2, further comprising a step of measuring a weight of said reference object by said digital scale for acquiring said first analog-digital conversion value.

4. The method, as recited in claim 3, wherein said target weight is input and pre-stored to said terminal device.

5. A method of measuring a weight of an object by a digital scale, comprising the steps of:

receiving a command from a terminal device by a digital scale to enter a calibration mode;

sending a response signal from said digital scale to said terminal device to confirm that said digital scale enters said calibration mode;

acquiring a first analog-digital conversion value by said digital scale, wherein said first analog-digital conversion value corresponds to a pre-calibration weight of a reference object;

acquiring a second analog-digital conversion value by said digital scale, said second analog-digital conversion value corresponding to a value when said digital scale has a weight reading of 0;

sending a pre-calibration weight of a reference object from said digital scale to said terminal device;

receiving a target weight of said reference object from said terminal device when an absolute value of a difference between the target weight of the reference object and the pre-calibration weight of the reference object is less than said predetermined calibration threshold; and ascertaining, by said digital scale, a target analog-digital conversion value per unit weight by reference to said first analog-digital conversion value, said second analog-digital conversion value and said target weight of said reference object, said target analog-digital conversion value per unit weight being utilized for measuring a weight of an object by said digital scale after calibration;

sending a response from said digital scale to said terminal device that a calibration of said digital scale has been completed;

generating a confirmation signal by said terminal device indicating that calibration of said digital scale is completed; and after calibration of said digital scale, measuring a weight of an object by said digital scale with calibrated precision.

* * * * *